US008509179B1

(12) United States Patent
Delker et al.

(10) Patent No.: US 8,509,179 B1
(45) Date of Patent: Aug. 13, 2013

(54) METHOD AND SYSTEM FOR POWER CONTROL IN A WIRELESS LAN

(75) Inventors: Jason R. Delker, Olathe, KS (US); John M. Everson, Kansas City, MO (US); Bryce A. Jones, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2491 days.

(21) Appl. No.: 10/836,372

(22) Filed: Apr. 30, 2004

(51) Int. Cl.
*H04Q 7/00* (2006.01)

(52) U.S. Cl.
USPC .......................................... 370/331; 370/335

(58) Field of Classification Search
USPC ................... 455/69, 13.4, 522, 525, 524, 500, 455/450, 453, 437, 434, 141; 370/392, 315, 370/236, 338, 395.21, 400
See application file for complete search history.

(56) References Cited

U.S. PATENT DOCUMENTS

| | | | |
|---|---|---|---|
| 5,450,616 A | 9/1995 | Rom | |
| 5,465,392 A | 11/1995 | Baptist et al. | |
| 5,465,398 A | 11/1995 | Flammer | |
| 5,553,076 A | 9/1996 | Behtash et al. | |
| 5,553,316 A | 9/1996 | Diepstraten et al. | |
| 5,560,021 A | 9/1996 | Vook et al. | |
| 5,805,994 A * | 9/1998 | Perreault et al. | 455/435.1 |
| 5,923,702 A | 7/1999 | Brenner et al. | |
| 5,995,496 A | 11/1999 | Honkasalo et al. | |
| 6,192,230 B1 | 2/2001 | Van Bokhorst et al. | |
| 6,411,608 B2 | 6/2002 | Sharony | |
| 6,430,193 B1 | 8/2002 | Raissinia et al. | |
| 6,463,307 B1 | 10/2002 | Larsson et al. | |
| 6,549,568 B1 * | 4/2003 | Bingel | 375/222 |
| 6,842,605 B1 * | 1/2005 | Lappetelainen et al. | 455/13.4 |
| 7,162,250 B2 * | 1/2007 | Misra | 455/453 |
| 7,174,134 B2 * | 2/2007 | Klein et al. | 455/69 |
| 7,236,470 B1 * | 6/2007 | Bims | 370/328 |
| 7,324,785 B2 * | 1/2008 | Hansen et al. | 455/69 |
| 7,336,634 B2 * | 2/2008 | del Prado et al. | 370/332 |
| 7,400,901 B2 * | 7/2008 | Kostic et al. | 455/525 |
| 2005/0128970 A1 * | 6/2005 | Tsien et al. | 370/315 |
| 2007/0004444 A1 * | 1/2007 | Klein et al. | 455/522 |

OTHER PUBLICATIONS

Plamen Nedeltchev, "Wireless Local Area Networks and the 802.11 Standard," Mar. 31, 2001.
Breeze Wireless Communications, Ltd., "IEEE 802.11 Technical Tutorial," 1998.
Bob O'Hara and Al Petrick, "The IEEE 802.11 Handbook: A Designer's Companion," 1999, pp. 88-93.

* cited by examiner

*Primary Examiner* — Chuong T Ho

(57) ABSTRACT

A mobile device for wireless communication with a wireless local area network (WLAN) includes a transceiver that is able to selectively transmit at a plurality of transmit power levels. When the mobile device associates with a wireless access point in the WLAN, the wireless access point transmits a control signal that controls the power level at which the mobile device transmits wireless signals to that wireless access point.

15 Claims, 2 Drawing Sheets

METHOD AND SYSTEM FOR POWER CONTROL IN A WIRELESS LAN

CROSS REFERENCE TO RELATED APPLICATIONS

Not Applicable.

STATEMENT REGARDING FEDERALLY SPONSORED RESEARCH

Not Applicable.

BACKGROUND

1. Field of the Invention

The present invention relates to telecommunications and, more particularly, to methods and systems for controlling the power levels at which mobile devices transmit when communicating with wireless access points.

2. Description of Related Art

Wireless local area networks (WLANs) are increasingly being used for data, voice, and other media. Such WLANs may use protocols, such as the IEEE 802.11x wireless LAN protocols, and may use unlicensed frequency bands, such as frequency bands in the 2.4 GHz range. A WLAN includes a wireless access point that provides a wireless coverage area within which mobile devices can communicate over an air interface. Such mobile devices may include, for example, wireless telephones, wireless PDAs, and/or laptop computers equipped with a WLAN network interface card (NIC).

Because of FCC restrictions in these unlicensed bands, a wireless coverage area in a WLAN typically has only a very limited geographic extent, such as only part of a building. To provide coverage in a wider geographic area, a WLAN can include multiple wireless coverage areas provided by multiple wireless access points. To prevent interference between signals in different wireless coverage areas, different channels may be used in adjacent wireless coverage areas. For example, when using 802.11 with direct sequence spread spectrum (DSSS), eleven channels are allowed in North America. These eleven channels are partially overlapping, but channels 1, 6, and 11 are non-overlapping.

As a mobile device moves between wireless coverage areas, a roaming process may occur in which the wireless access point and/or channel the mobile device uses to communicate changes. In 802.11x systems, roaming is typically initiated by a mobile device when the mobile device loses contact with the wireless access point with which it is associated or when the mobile device judges the communication with that wireless access point to be poor (e.g., a low data rate due to a weak signal). The mobile device then attempts to locate another wireless access point (e.g., using either active scanning or passive scanning) and to associate with it.

Thus, roaming in 802.11x systems is typically a break-before-make process. Moreover, a mobile device typically does not attempt to find the optimal wireless access point (e.g., the closest) as it moves. Instead, a mobile device typically continues to communicate with the wireless access point with which it is currently associated until the wireless connection becomes unacceptable, even though another wireless access point may be closer.

As a result of the limited number of non-overlapping channels and the way roaming typically occurs, designing a WLAN with a large number of wireless coverage areas to cover a contiguous area can be challenging. This difficulty can be exacerbated by the power levels that mobile devices use to transmit. In particular, the power level at which a mobile device transmits is often set by the user and remains fixed as the mobile device engages in wireless communication and moves from one wireless coverage area to another. For example, a laptop computer may have software for controlling a WLAN NIC that includes an option by which the user can set the transmit power level. In many cases, however, the software may use the highest power level (e.g., 100 mW for 802.11) as the default, and many users may never change the default setting. As a result, many mobile devices may communicate with the WLAN at an inefficiently high power level. Such high power levels needlessly reduce the battery life of the mobile devices. High power levels can also cause congestion because a mobile device transmitting at a high power level is more likely to continue communicating with the wireless access point of the previous wireless coverage area when the mobile device moves into a new wireless coverage area. In addition, because mobile devices may transmit at power levels comparable to the power levels at which wireless access points transmit in many WLANs, high power levels transmitted from mobile devices can interfere with the transmissions from wireless access points.

Accordingly, there is a need to provide ways to better control the power levels at which mobile devices transmit when communicating with wireless access points.

SUMMARY

In a first principal aspect, an exemplary embodiment of the present invention provides a method of wireless communication between a mobile device and at least one wireless access point of a wireless local area network (WLAN). The mobile device transmits wireless signals at an adjustable power level. In accordance with the method, a wireless access point wirelessly transmits a control signal to a mobile device. The control signal controls the power level at which the mobile device transmits wireless signals to that wireless access point.

In a second principal aspect, an exemplary embodiment of the present invention provides a mobile device for wireless communication with a wireless access point of a wireless local area network (WLAN). The mobile device comprises a radio frequency (RF) transceiver for transmitting wireless signals to the wireless access point and for receiving wireless signals from the wireless access point, and a controller coupled to the RF transceiver. The RF transceiver is able to selectively transmit wireless signals at a plurality of transmit power levels. The controller selects one of the plurality of transmit power levels in response to a control signal from the wireless access point.

DETAILED DESCRIPTION OF EXEMPLARY EMBODIMENTS

Figure 1:
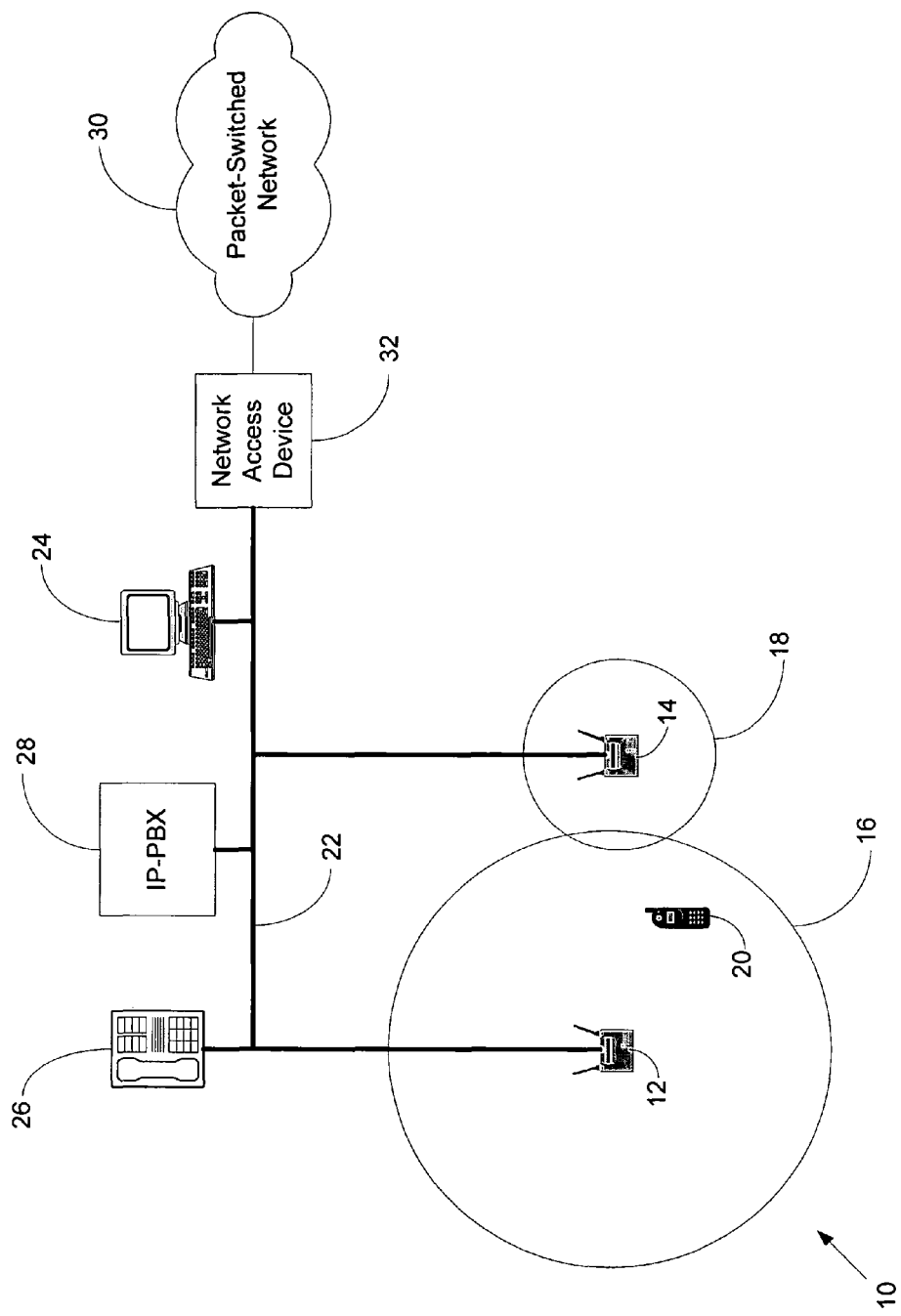
FIG. 1 is a simplified diagram showing the layout a wireless local area network (WLAN), in accordance with an exemplary embodiment of the present invention.

In an exemplary embodiment of the present invention, one or more wireless access points in a wireless local area network (WLAN) control the power levels at which mobile devices transmit wireless signals. For example, when a mobile device associates with a wireless access point, the wireless access point may transmit a control signal to the mobile device. The mobile device may then adjust its transmit power level in response to the control signal.

More specifically, the control signal may indicate a particular transmit power level, and the mobile device may adjust its transmit power based on the transmit power level indicated by the control signal. The transmit power level indicated by the control signal could be, for example, a recommended transmit power level, in which case the mobile device may adjust its transmit power level to be substantially the same as the transmit power level indicated by the control signal. Alternatively, the transmit power level indicated by the control signal could be, for example, a maximum transmit power level, in which case the mobile device may adjust its transmit power level so that it does not exceed the transmit power level indicated by the control signal.

The wireless access point may transmit the control signal as a particular code in the association response it transmits to the mobile device in response to the mobile device's association request. As described in more detail below, the transmit power level may be specifically selected for the particular wireless access point, e.g., based on the position of the wireless access point and the size of the wireless coverage area intended for the wireless access point. The transmit power level indicated by the control signal may be related to the transmit power level of the wireless access point. For example, a wireless access point may control the transmit power levels of mobile devices to be substantially the same as, or do not exceed, the power level at which the wireless access point transmits wireless signals.

In response to the control signal, the mobile device may adjusts its transmit power level based on the transmit power level indicated by the control signal. This may involve the mobile device using the exact transmit power level indicated by the control signal. However, if only a few discrete transmit power levels are available to the mobile device, the mobile device may select the transmit power level that is the closest to, without exceeding, the transmit power level indicated by the control signal.

The mobile device may continue to use this transmit power level to transmit signals to the wireless access point until directed otherwise. In particular, when the mobile device associates with a new wireless access point, e.g., as a result of roaming, the new wireless access point may direct the mobile device to use a different power level. In this way, a WLAN containing multiple wireless access points may be designed such that each wireless access point directs the mobile devices in communication with it to transmit at a particular transmit power level that has been preselected for that wireless access point.

The preselected transmit power levels for the mobile devices may be different for different wireless access points, depending on a number of factors. For example, a wireless access point that is intended to provide wireless coverage in a relatively small geographic area may transmit at a relatively low power level and may direct mobile devices to use a similarly low transmit power level. On the other hand, a wireless access point intended to provide a wireless coverage in a relatively large geographic area may transmit at a relatively high power level and may direct mobile devices to use a similarly high transmit power level. Thus, in an exemplary embodiment, a wireless access point may direct mobile devices that have associated with it to transmit at power levels that are related to (e.g., the same or no more than) the power level at which the wireless access point transmits. By controlling the power levels at which mobile devices transmit in this way, WLANs can be designed more reliably and can be operated more efficiently. This approach can also result in better security because of reduced extraneous RF emissions from mobile devices.

1. EXEMPLARY WLAN

The layout of an exemplary WLAN 10 is shown in FIG. 1. WLAN 10 has one or more wireless access points, such as wireless access point 12 and wireless access point 14, as shown in FIG. 1. Although FIG. 1 shows two wireless access points, it is to be understood that WLAN 10 could have a greater or fewer number of wireless access points. Wireless access points 12 and 14 define wireless coverage areas 16 and 18, respectively, within which wireless access points 12 and 14 are able to wirelessly communicate with mobile devices, such as mobile device 20. The wireless communications between mobile device 20 and wireless access points 12 and 14 may conform to or make use of, for example, IEEE 802.11x standards, Bluetooth specifications, HomeRF specifications, HiperLAN standards, Multichannel Multipoint Distribution Service (MMDS) techniques, or to some other wireless protocol. The wireless communications between mobile device 20 and WLAN 10 may involve voice, data, and/or other media.

Mobile device 20 could function as a laptop computer, a personal digital assistant (PDA), or wireless telephone, for example. In some cases, the wireless communication capability of mobile device 20 may be provided by a network interface card (NIC), which may be removable. In addition, mobile device 20 may be able to communicate with wireless networks other than WLAN 10. For example, mobile device 20 may be able to communicate with a wireless wide area network (WWAN), e.g., using CDMA, TDMA, or GSM.

Wireless access points 12 and 14 are interconnected by a distribution system 22, which may include a wired LAN, for example. Other network elements may also be connected to distribution system 22. For example, a computer 24, which may function as a data server, may be connected to distribution system 22. Distribution system 22 may also carry voice in a voice-over-packet (VoP) packet format. Thus, one or more VoP communication devices, such as VoP telephone 26, may be connected to distribution system 22. An IP-PBX 28 or other controller may be connected to distribution system 22 to control VoP communications through distribution system 22. Distribution system 22 may also be connected to other networks. For example, distribution system 22 may be connected to a packet-switched network 30 (e.g., the Internet) via a network access device 32. Network access device 32 may be a cable modem, DSL modem, or router, for example. Alternatively or additionally, distribution system 22 may be connected to the public switched telephone network (PSTN), e.g., for voice communication. In this way, mobile device 20 may use wireless access points 12 or 14 to communicate with other mobile devices, to communicate with other network elements connected to distribution system 22, such as computer 24 or VoP telephone 26, or to communicate via other networks, such as the Internet or the PSTN.

As shown in FIG. 1, wireless coverage areas 16 and 18, provided by wireless access points 12 and 14, respectively, may be (but need not be) overlapping and may differ in geographic extent. Wireless access points 12 and 14 may communicate using the same wireless channel, e.g., the same 802.11 channel, or using different channels. It is to be understood that although wireless coverage areas 16 and 18 are shown as circles in FIG. 1, these coverage areas could have different shapes. In general, the sizes and shapes of wireless coverage areas 16 and 18 may be determined by the power levels at which wireless access points 12 and 14, respectively, transmit, and also by the location of obstructions, such as walls. Thus, wireless coverage area 18 may be smaller than wireless coverage area 16, as shown in FIG. 1, because wireless access point 14 may transmit at a lower power level than wireless access point 12 or because wireless coverage area 18 may be located inside of a building and limited by walls and wireless coverage 16 may be located outside of the building.

One or more transmit power levels for mobile devices, such as mobile device 20, may be selected for each of wireless coverage areas 16 and 18. In an exemplary embodiment, only one transmit power level is selected for each wireless coverage area, i.e., so that the transmit power level would apply to all mobile devices in that wireless coverage area. Alternatively, the transmit power level may depend on the particular mobile device and/or other factors.

The transmit power level for the mobile devices may be selected in advance for a particular wireless coverage area based on a number of factors. One consideration, for example, could be the geographic extent of the wireless coverage area. Thus, mobile devices could be directed to transmit at higher power levels in larger wireless coverage areas and at lower power levels in smaller wireless coverage areas. Similarly, the transmit power levels for mobile devices may be controlled so as not to exceed the power level at which the particular wireless access point transmits. For example, if a particular wireless access point transmits at a power level of 50 mW, the wireless access point may control the transmit power levels of mobile devices that have associated with it so that the mobile devices' transmit power levels do not exceed 50 mW.

A mobile device may receive a control signal with an indicated transmit power level when the mobile device associates with a wireless access point. The transmit power level may be provided as a particular code that the wireless access point includes in an association response message. Thus, when mobile device 20 enters wireless coverage area 16, mobile device 20 may attempt to associate with wireless access point 12 by transmitting an association request. Wireless access point 12 may receive the association request and may then select the transmit power level for mobile device 20. This selection process may involve wireless access point 12 communicating with one or more other network elements, such as computer 24. Once the transmit power level is selected, wireless access point 12 transmits the mobile device transmit power level, e.g., as a particular code, to mobile device 20 in an association response message.

Mobile device 20 may then adjust the power level at which it transmits based on the transmit power level provided by wireless access point 12. As a result of this adjustment, mobile device 20 may transmit at the exact power level indicated by wireless access point 12 or, if mobile device 20 has only a few, discrete transmit power levels available, then at the nearest available transmit power level that does not exceed the transmit power level indicated by wireless access point 12. In an exemplary embodiment, mobile device 20 may then use this transmit power level for all of its subsequent communications with wireless access point 12. However, wireless access point 12 may also be able to direct mobile device 20 to use a different transmit power level at a later time.

When mobile device 20 moves into a different wireless coverage area, e.g., wireless coverage area 18, mobile device 20 may be directed to use a different transmit power level. For example, when mobile device 20 moves into wireless coverage area 18, mobile device 20 may attempt to associate with wireless access point 14 by transmitting an association request. Wireless access point 14 may respond with an association response message that includes a new transmit power level for mobile device 20. The new transmit power level may be specifically selected for wireless coverage area 18 and, thus, may lead to a different transmit power level than mobile device 20 used in wireless coverage area 16. For example, the transmit power level that mobile device 20 uses in wireless coverage area 18 may be lower than the transmit power level that mobile device 20 used in wireless coverage 16. In this way, WLAN 10 may be designed for greater efficiency and/or security by controlling the power levels at which mobile devices transmit in particular wireless coverage areas.

2. EXEMPLARY MOBILE DEVICE

Figure 2:
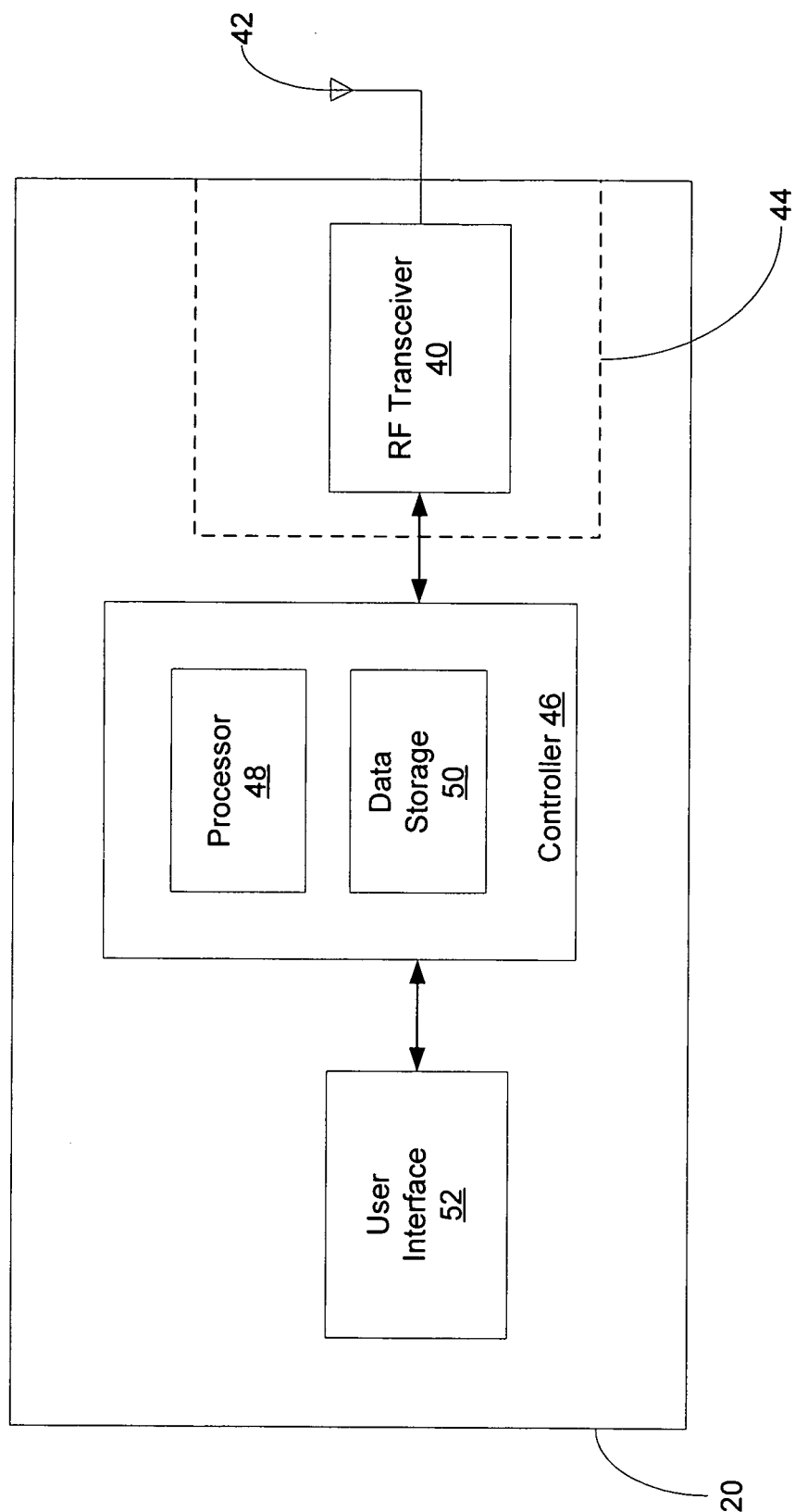
FIG. 2 is a simplified block diagram of a mobile device, in accordance with an exemplary embodiment of the present invention.

FIG. 2 is a simplified block diagram of mobile device 20, in accordance with an exemplary embodiment. Mobile device 20 includes a radio frequency (RF) transceiver 40, with an antenna 42, for transmitting and receiving wireless signals. As described in more detail below, RF transceiver 40 is able to selectively transmit at a plurality of transmit power levels, including at least a first transmit power level and a second transmit power level. In an exemplary embodiment, RF transceiver 40 and antenna 42 may be provided on a network interface card (NIC) 44, which, in some cases, may be removable from mobile device 20.

RF transceiver 40 is coupled to a controller 46 that controls the functioning of mobile device 20, including RF transceiver 40. In particular, controller 46 selects what transmit power level mobile device 20 will use to transmit wireless signals and controls RF transceiver 40 accordingly, as described in more detail below. Controller 46 may be provided as hardware, software, and/or firmware. In an exemplary embodiment, controller 46 includes a processor 48 and data storage 50. Data storage 50, which may include volatile memory, such as RAM, and/or non-volatile memory, such as ROM or flash memory, stores a plurality of machine language instructions that are executable by processor 48 to control the functioning of mobile device 20.

Mobile device 20 also includes a user interface 52 through which the user may interact with mobile device 20. User interface 52 may include a display screen to display visual information to the user and/or an audio system to convey voice or other audio information to the user. User interface 52 may also include components to receive input from the user. Such input components may include, for example, one or more buttons, switches, touch-sensitive surfaces, and/or microphones. Thus, through user interface 52, the user may exchange voice, data, or other media and may control the operation of mobile device 20.

Controller 46 may control the transmit power level used by RF transceiver 40 based on control signals transmitted from wireless access points, e.g., wireless access points 12 and 14. The wireless access points may transmit these control signals, for example, in association response messages. Thus, controller 46 may recognize a control signal in an association response message as indicative of a particular transmit power level. In response, controller 46 may select a transmit power level based on the control signal, e.g., the transmit power level available to RF transceiver 40 that most closely corresponds to (without exceeding) the transmit power level indicated by the control signal from the wireless access point. Once controller 46 selects a transmit power level in this way, controller 46 may control RF transceiver 40 so that it transmits at this selected power level.

3. CONCLUSION

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of wireless communication between a mobile device and at least one wireless access point of a wireless local area network (WLAN), wherein said mobile device transmits wireless signals at an adjustable transmit power level, said method comprising:
   a first wireless access point storing a first predetermined transmit power level in accordance with an intended coverage area of said first wireless access point, wherein said first predetermined transmit power level is preferred to be used by any mobile device associating therewith;
   said mobile device wirelessly transmitting a first association request to said first wireless access point of said WLAN; and
   in response to said first association request, said first wireless access point wirelessly transmitting a first association response to said mobile device, wherein said first association response includes a first control signal that indicates said first predetermined transmit power level to control said adjustable transmit power level.

2. The method of claim 1, further comprising:
   in response to said first control signal, said mobile device adjusting said adjustable transmit power level based on said first transmit power level.

3. The method of claim 2, wherein said mobile device adjusts said adjustable transmit power level so that it does not exceed said first transmit power level.

4. The method of claim 2, wherein said mobile device adjusts said adjustable transmit power level to be substantially the same as said first transmit power level.

5. The method of claim 4, wherein said first wireless access point transmits wireless signals at said first transmit power level.

6. The method of claim 1, further comprising:
   said mobile device breaking association with said first wireless access point;
   said mobile device wirelessly transmitting a second association request to a second wireless access point of said WLAN, wherein said second wireless access point stores a second predetermined transmit power level in accordance with an intended coverage area of said second wireless access point, and wherein said second predetermined transmit power level is preferred to be used by any mobile device associating therewith; and
   in response to said second association request, said second wireless access point wirelessly transmitting a second association response to said mobile device, wherein said second association response includes a second control signal that indicates said second predetermined transmit power level.

7. The method of claim 6, further comprising:
   in response to said second control signal, said mobile device adjusting said adjustable transmit power level based on said second transmit power level.

8. The method of claim 7, wherein said mobile device adjusts said adjustable transmit power level so that it does not exceed said second transmit power level.

9. The method of claim 7, wherein said mobile device adjusts said adjustable transmit power level to be substantially the same as said second transmit power level.

10. The method of claim 9, wherein said second wireless access point transmits wireless signals at said second transmit power level.

11. A mobile device for wireless communication with a wireless access point of a wireless local area network (WLAN), wherein said wireless access point stores a predetermined transmit power level in accordance with an intended coverage area of said wireless access point, and wherein said predetermined transmit power level is preferred to be used by any mobile device associating therewith, said mobile device comprising:
   a radio frequency (RF) transceiver for transmitting wireless signals to said wireless access point and receiving wireless signals from said wireless access point, said RF transceiver being able to selectively transmit wireless signals at a plurality of transmit power levels; and
   a controller coupled to said RF transceiver, wherein said controller comprises:
      a processor;
      data storage; and
      a plurality of machine language instructions stored in said data storage and executable by said processor for:
         (a) recognizing a control signal in an association response message from said wireless access point, wherein said control signal indicates said predetermined transmit power level;
         (b) selecting a transmit power level based on said control signal; and
         (c) causing said RF transceiver to transmit at said selected power level in conformance with said predetermined transmit power level in said intended coverage area of said wireless access point.

12. The mobile device of claim 11, wherein said mobile device functions as a laptop computer.

13. The mobile device of claim 11, wherein said mobile device functions as a personal digital assistant (PDA).

14. The mobile device of claim 11, wherein said mobile device functions as a wireless telephone.

15. The mobile device of claim 11, wherein said RF transceiver is on a network interface card (NIC) that is removable from said mobile device.

* * * * *